(12) United States Patent
Lu et al.

(10) Patent No.: US 6,655,645 B1
(45) Date of Patent: Dec. 2, 2003

(54) AUTOMATICALLY ADJUSTING SUPPORT FOR AN LCD MONITOR

(75) Inventors: Sheng-Nan Lu, Shulin (TW); Hsiang-Chi Chien, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 10/331,473

(22) Filed: Dec. 31, 2002

(51) Int. Cl.$^7$ ............................................... F16M 11/00
(52) U.S. Cl. ..................... 248/176.1; 248/921; 248/922; 248/923
(58) Field of Search ................................. 248/919, 920, 248/921, 922, 923, 176.1, 371, 125.8, 188.5, 917

(56) References Cited

U.S. PATENT DOCUMENTS

| | | | | |
|---|---|---|---|---|
| 4,577,827 A | * | 3/1986 | Eliscu | 248/656 |
| 6,095,476 A | * | 8/2000 | Mathis | 248/422 |
| RE36,978 E | * | 12/2000 | Moscovitch | 248/122.1 |
| 6,352,226 B1 | * | 3/2002 | Gordon | 248/125.2 |
| 6,466,249 B1 | * | 10/2002 | Granot et al. | 348/14.08 |

* cited by examiner

Primary Examiner—Ramon O Ramirez
Assistant Examiner—Amy J. Sterling
(74) Attorney, Agent, or Firm—Rosenberg, Klein & Lee (57) ABSTRACT

An automatically adjusting support for an LCD monitor is composed of a bottom seat, an elevating part, a rotating part, a longitudinally moving part, and an installing plate. An LCD monitor secured on the installing plate can be adjusted in height by the elevating part, at a horizontal angle by the rotating part, and at a vertical angle by the longitudinally moving part.

9 Claims, 9 Drawing Sheets

AUTOMATICALLY ADJUSTING SUPPORT FOR AN LCD MONITOR

BACKGROUND OF THE INVENTION

1. Field of the Invention

The present invention is related to an automatically adjusting support for an LCD monitor which can be electrically operated.

2. Description of Related Art

An LCD monitor is generally installed on an adjusting support. The support is manually adjusted by a user, which is inconvenient for the user to operate by hand.

Therefore, the invention provides an automatically adjusting support for an LCD monitor to mitigate and/or obviate the aforementioned problems.

SUMMARY OF THE INVENTION

The main objective of the invention is to provide an automatically adjusting support for an LCD monitor which can be electrically operated.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
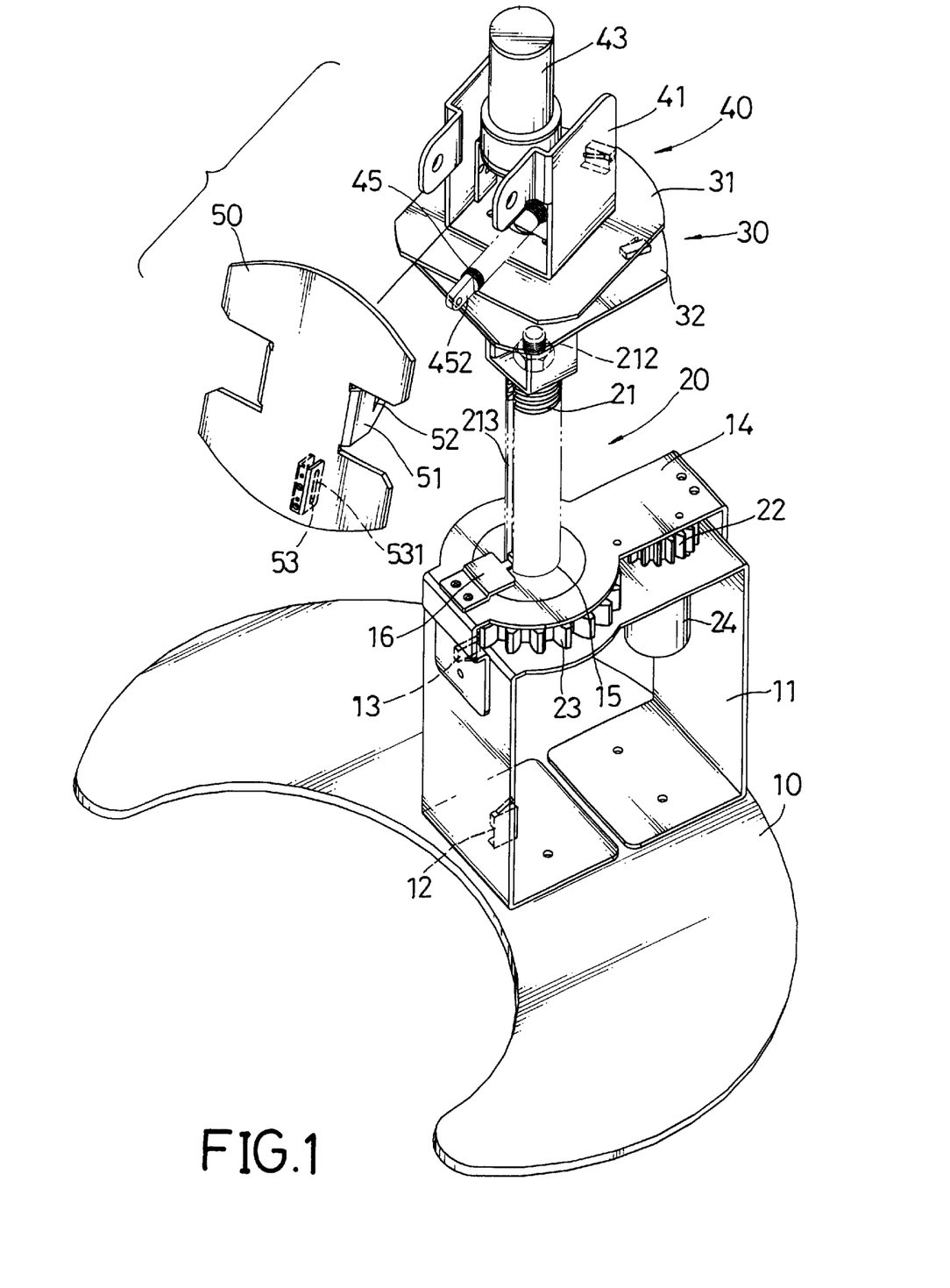
FIG. 1 is a perspective view of an automatically adjusting support in accordance with the invention.
Figure 2:
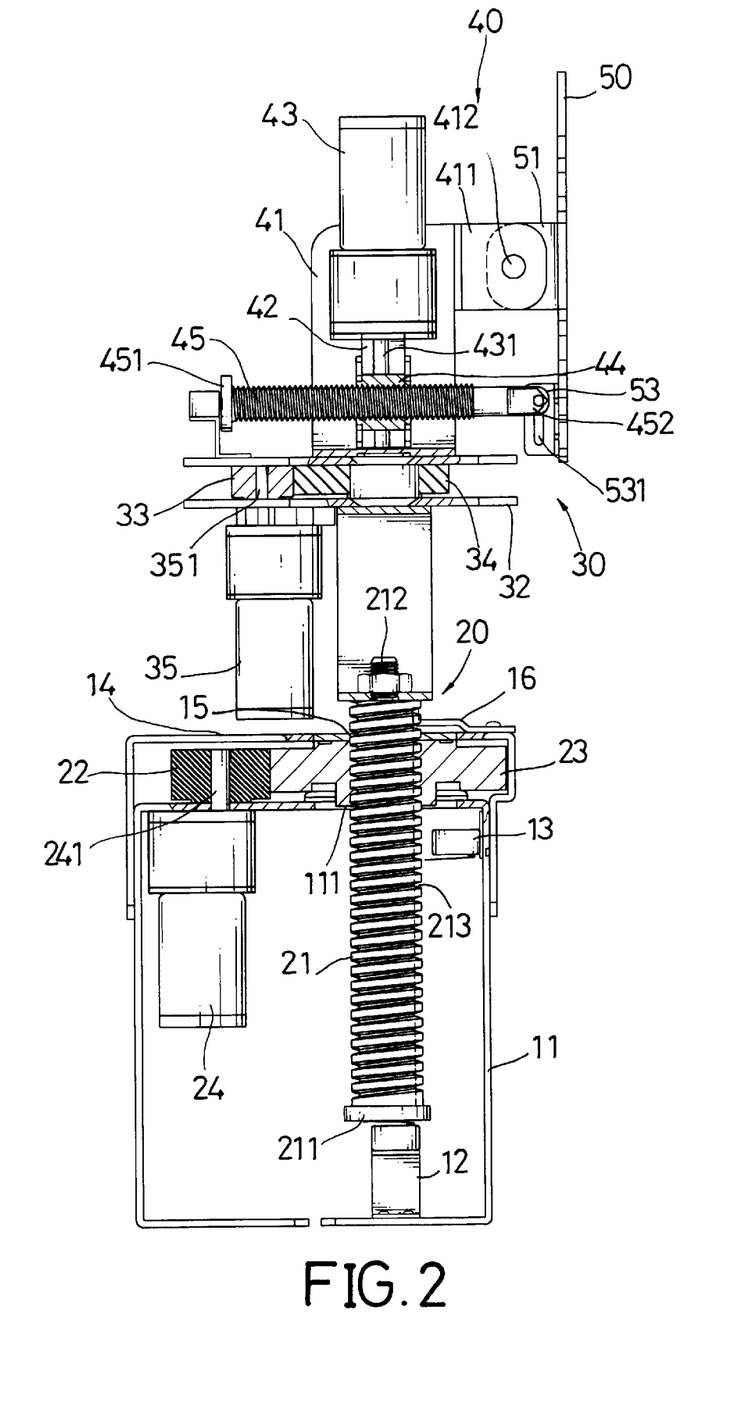
FIG. 2 is a sectional side view of the automatically adjusting support.
Figure 3:
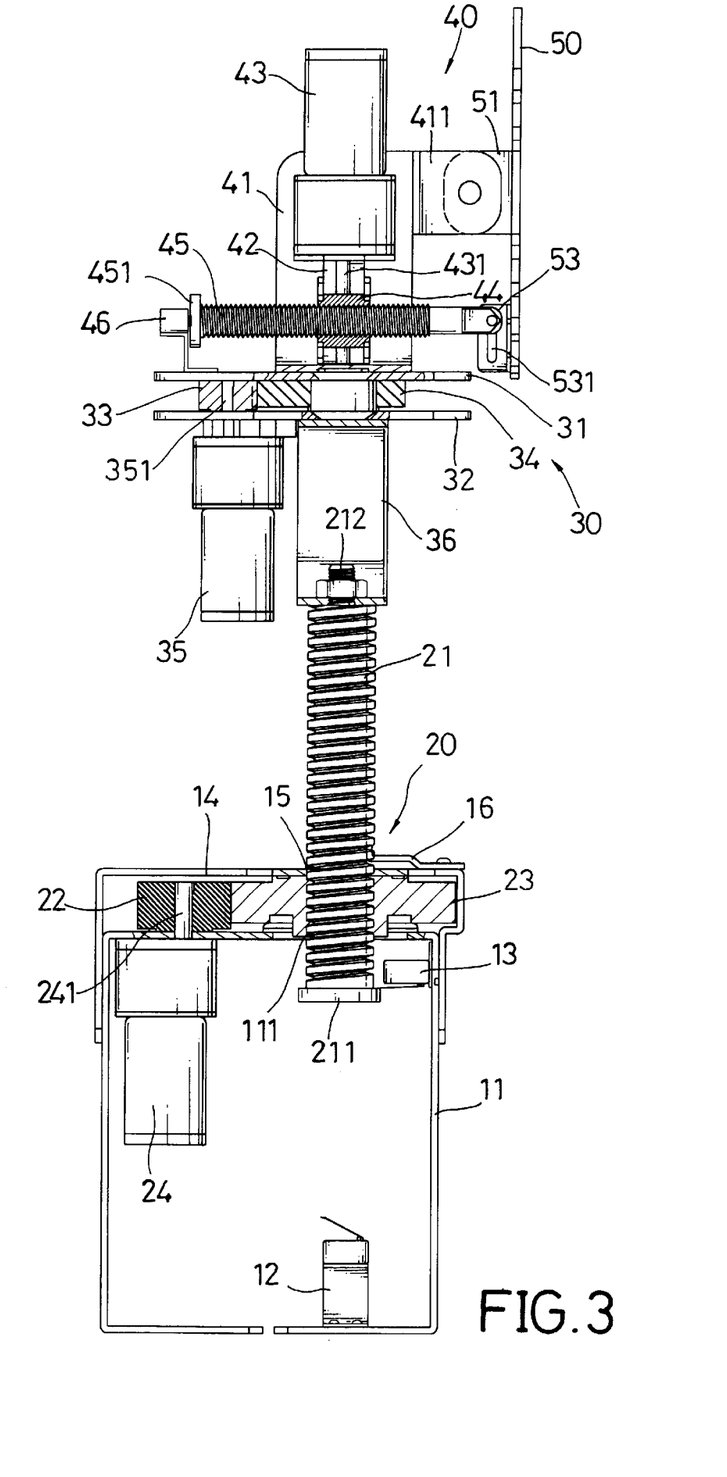
FIG. 3 is another sectional side view of the automatically adjusting support, wherein an elevating part of the support is elevated.

Referring to FIGS. 1–3, an automatically adjusting support in accordance with the invention is composed of a bottom seat (10), an elevating part (20), a rotating part (30), a longitudinally moving part (40), and an installing plate (50).

The bottom seat (10) has a bracket (11) mounted on a bottom plate (not numbered). A first elevating limit switch (12) and a second elevating limit switch (13) are provided in the bracket (11). A first opening (111) is defined through an upper surface of the bracket (11). An upper plate (14) is mounted upon the bracket (11), and has a second opening (15) defined therethrough and aligned with the first opening (111). A guide sheet (16) is mounted on the upper plate (14) and has a lug (not numbered) protruded towards the second opening (15).

The elevating part (20) has a vertical threaded shaft (21) extending through the first opening (111) and the second opening (15). A vertical stop disk (211) is provided at a lower end of the vertical threaded shaft (21) for actuating the first and second elevating limit switches (12, 13). An upper end (212) of the vertical threaded shaft (21) is attached to the rotating part (30). A channel (213) is longitudinally defined at an outer periphery of the vertical threaded shaft (21), and the lug of the guide sheet (16) is located in the channel (213) of the vertical threaded shaft (21).

A first elevating gear (22) and a second elevating gear (23) are installed between the bracket (11) and the upper plate (14) and engaged with each other. A elevating motor (24) for driving the first elevating gear (22) is mounted beneath the upper surface of the bracket (11), and is connected to the first elevating gear (22) by an output axle (241) of the elevating motor (24). The vertical threaded shaft (21) is threadingly engaged in the second elevating gear (23). When the elevating motor (24) is actuated, the first elevating gear (22) is rotated to drive the second elevating gear (23), and the vertical threaded shaft (21) can be moved upwards or downwards. When the vertical stop disk (211) reaches the elevating limit switches (12,13), the elevating motor (24) is switched off to prevent the vertical threaded shaft (21) from exceeding limit positions.

The rotating part (30) has a mobile plate (31) and an immobile plate (32) spaced apart from each other. A linking member (36) is mounted beneath the immobile plate (32), and the upper end (212) is attached to the linking member (36) to mount the rotating part (30) on the vertical threaded shaft (21). A first horizontally adjusting gear (33) and a second horizontally adjusting gear (34) are installed between the mobile plate (31) and the immobile plate (32), wherein the first horizontally adjusting gear (33) is secured on the immobile plate (32), and the second horizontally adjusting gear (34) is secured on the mobile plate (31). A horizontally adjusting motor (35) for driving the first horizontally adjusting gear (33) is mounted beneath the immobile plate (32), and is connected to the first horizontally adjusting gear (33) by an output axle (351) of the horizontally adjusting motor (35).

Figure 4:
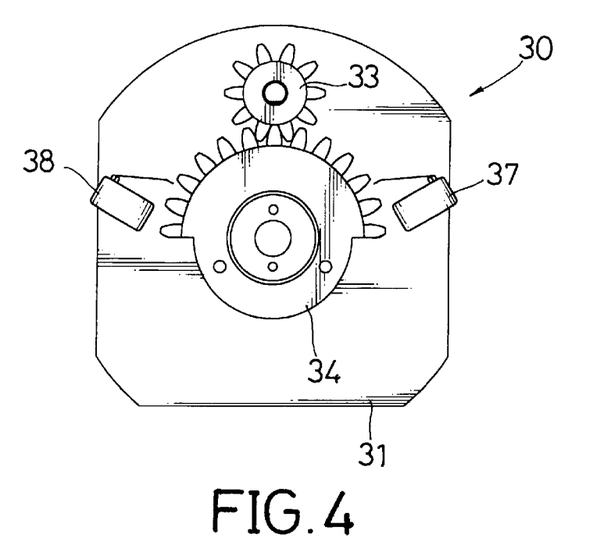
FIG. 4 is a partial top view of a rotating part of the support in accordance with the invention.
Figure 5:
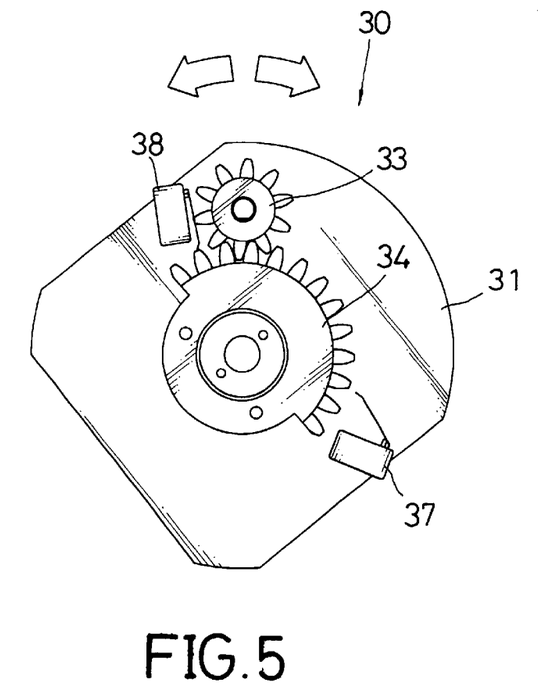
FIG. 5 is a partial top view showing that a mobile plate of the rotating part in FIG. 4 is rotated.
Figure 6:
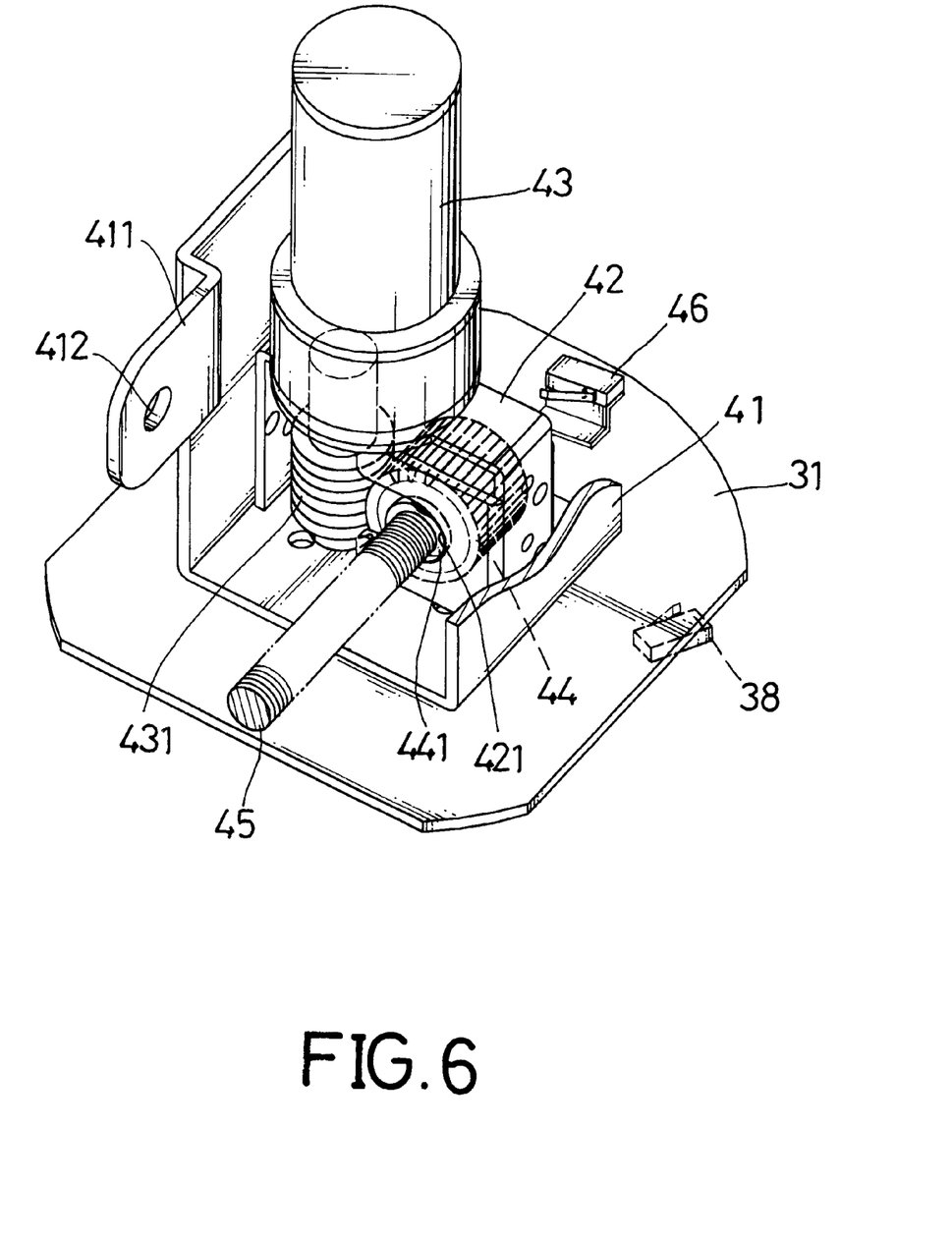
FIG. 6 is a partial perspective view of a longitudinally moving part of the support in accordance with the invention.

Specially referring to FIGS. 4 and 5, a first horizontally adjusting limit switch (37) and a second horizontally adjusting limit switch (38) are mounted on the mobile plate (31) and respectively at two sides of the second horizontally adjusting gear (34). When the horizontally adjusting motor (35) is actuated, the first horizontally adjusting gear (33) is rotated to drive the second horizontally adjusting gear (34), and the mobile plate (31) can be rotated along with the second horizontally adjusting gear (34) about the immobile plate (32) and the first horizontally adjusting gear (33) as indicated by arrows in FIG. 5. When the first horizontally adjusting gear (33) reaches the first horizontally adjusting limit switch (37) or the second horizontally adjusting limit switch (38), the horizontally adjusting motor (35) is switched off to prevent the mobile plate (31) from exceeding limit positions.

Referring to FIG. 1–3, and 6, the longitudinally moving part (40) has a U-like seat (41), formed with two upright portions (not numbered) and a lateral portion (not numbered) between the upright portions, mounted on the mobile plate (31). Two first ears (411) are respectively formed on the upright portions of the U-like seat (41), and two first apertures (412) respectively defined through the first ears (411). A gear carrier (42) is mounted in the U-like seat (41), and a vertically adjusting motor (43) is mounted beside the gear carrier (42). A worm (431) is connected to the vertically adjusting motor (43) and engaged with a vertically adjusting gear (44) installed in the gear carrier (42). The gear carrier (42) has two notches (421) respectively defined at a forward side and a backward side thereof, and the vertically adjusting gear (44) is rotatably mounted in the gear carrier (42) by two flanges (441) respectively located in the notches (421). A horizontal threaded shaft (45) is threadingly engaged in the vertically adjusting gear (44), and has a forward end (452) and a horizontal stop disk (451) provided at a backward end thereof.

Figure 7:
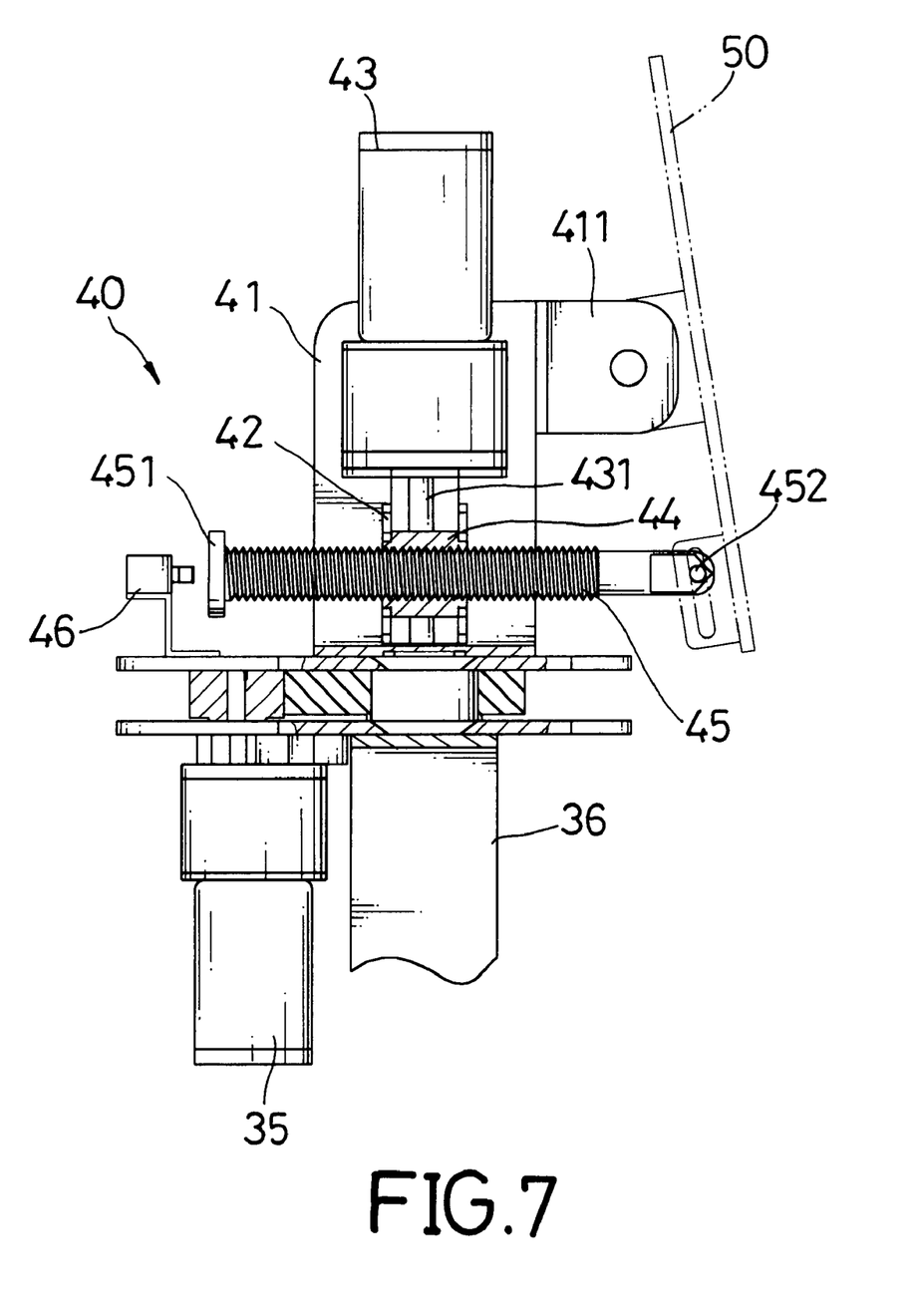
FIG. 7 is a partial sectional side view of the longitudinally moving part in FIG. 6.
Figure 8:
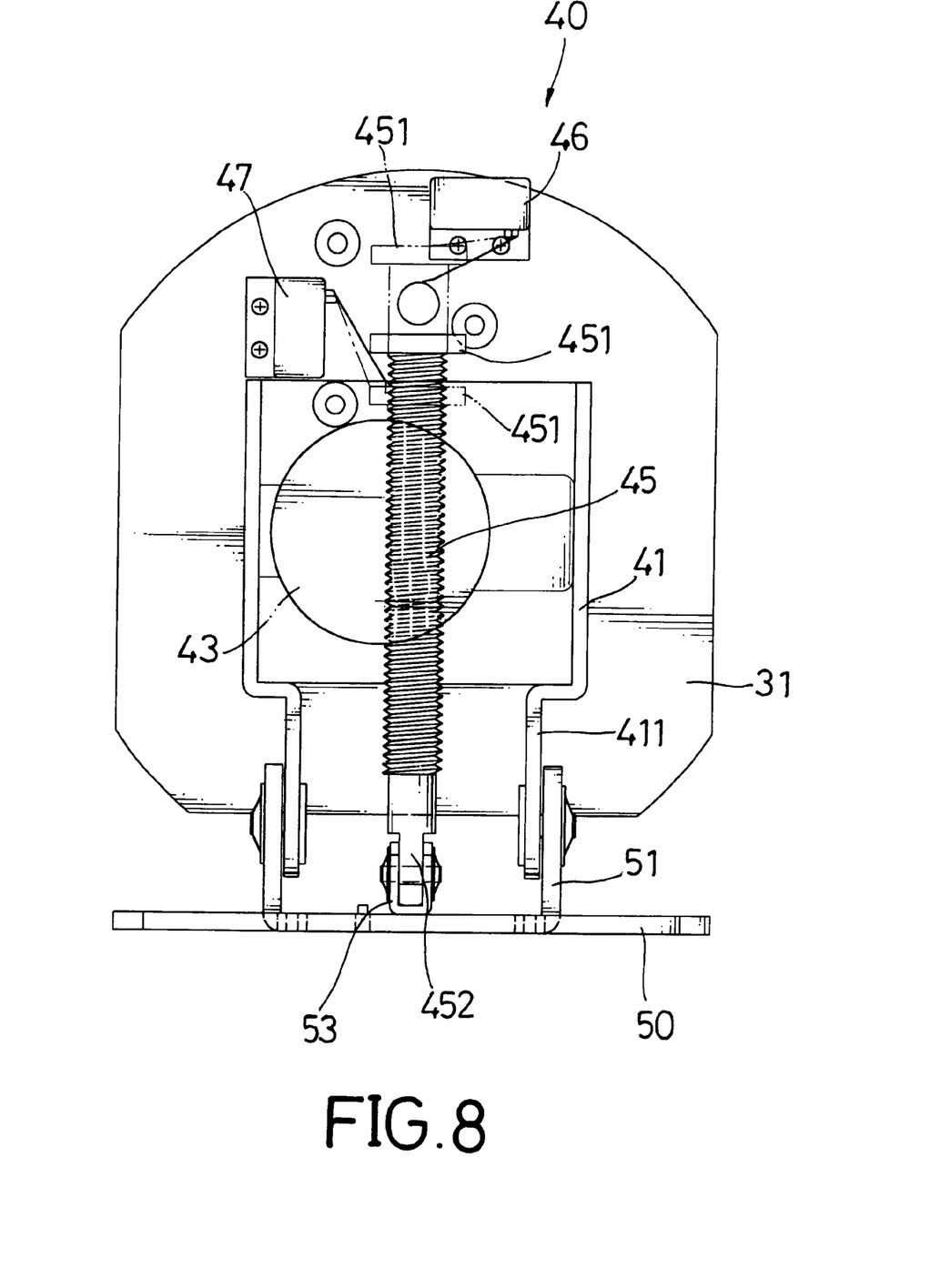
FIG. 8 is a partial sectional top view of FIG. 7.

Specially referring to FIGS. 3, 7 and 8, a first vertically adjusting limit switch (46) and a second vertically adjusting limit switch (47) are mounted on the mobile plate (31) and behind the U-like seat (41). When the vertically adjusting motor (43) is actuated, the worm (431) is rotated to drive the vertically adjusting gear (44), and the horizontal threaded shaft (45) can be longitudinally moved forwards or backwards. When the horizontal stop disk (451) reaches the first vertically adjusting limit switch (36) or the second vertically adjusting limit switch (37), the vertically adjusting motor (43) is switched off to prevent the horizontal threaded shaft (45) from exceeding limit positions.

Referring to FIGS. 1, 7, and 8, the installing plate (50) has two second ears (51) formed at a backward surface thereof and two second apertures (52) respectively defined through the second ears (51). Two third ears (53) are formed beneath the second ears (51), and two elongated holes (531) respectively defined through the third ears (53). The second ears (51) are pivotally mounted with the first ears (411) of the U-like seat (41), and the forward end (452) of the horizontal threaded shaft (45) is pivotally mounted between the third ears (53) by a fastener inserted through the elongated holes (531). Therefore, when the horizontal threaded shaft (45) is moved forwards or backwards, the installing plate (50) can be pivoted upwards or downwards about the first ears (411).

Figure 9:
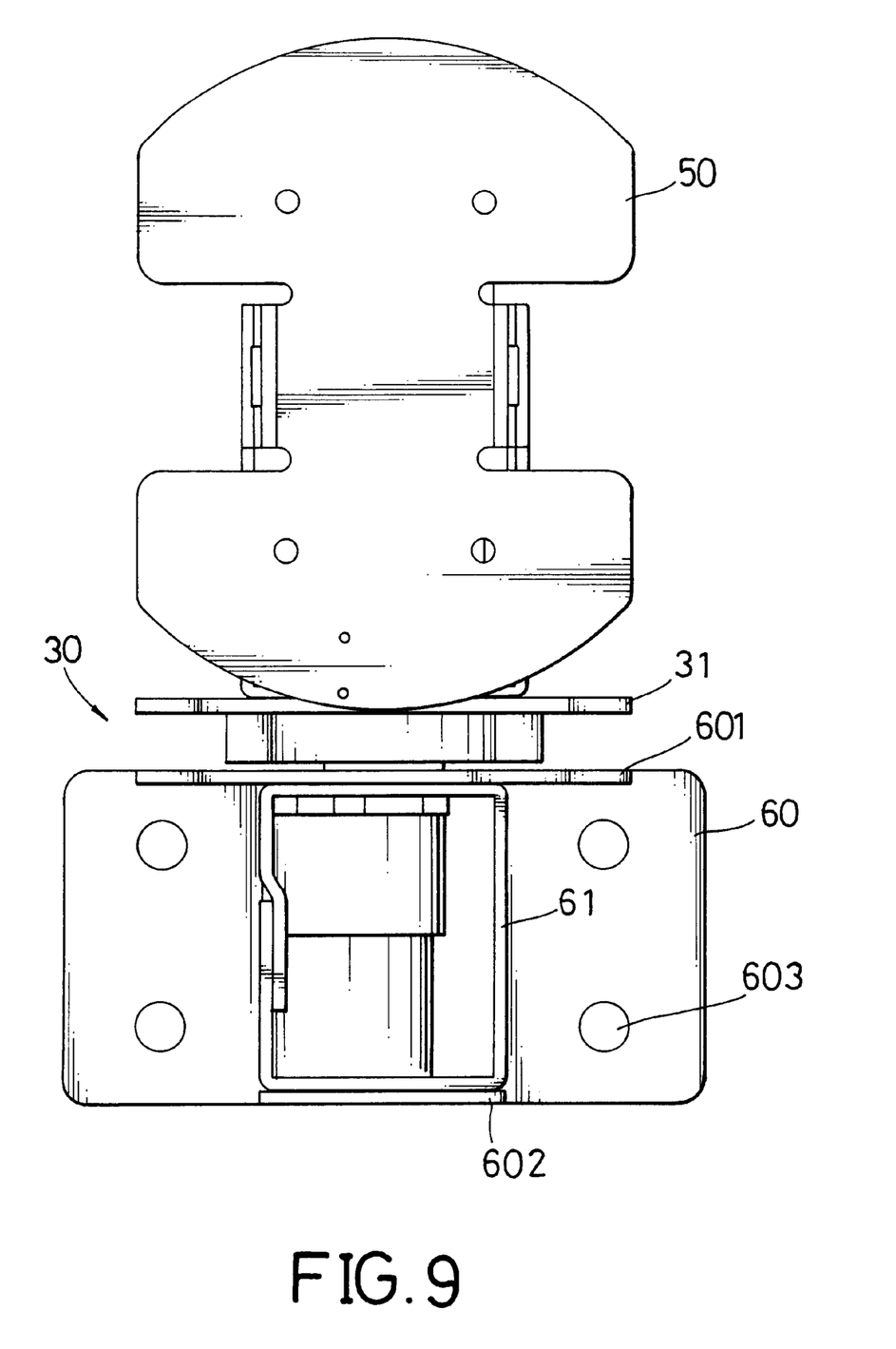
FIG. 9 is a front view of a second embodiment in accordance with the invention.
Figure 10:
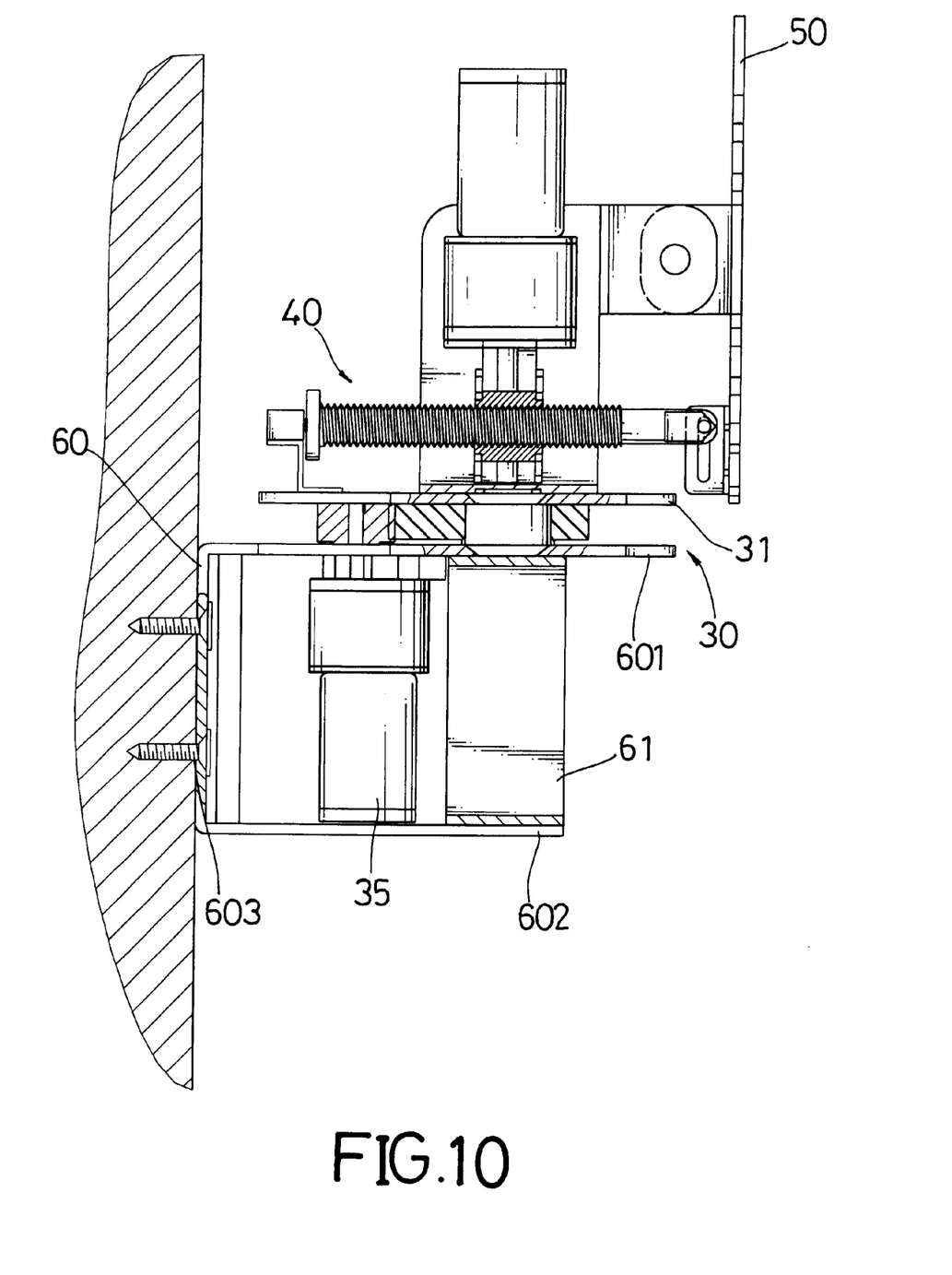
FIG. 10 is a sectional side view of FIG. 9.

In use, an LCD monitor (not shown or numbered) is installed on the installing plate (50). The motors (24, 35, 43) and the limit switches (12, 13, 37, 38, 46, 47) are electrically connected with a control circuit (not shown or numbered) to operate these electrical elements. Therefore, the LCD monitor can be automatically adjusted in height by means of actuating the elevating motor (24) to elevate or lower the vertical threaded shaft (21), at a horizontal angle by means of actuating the horizontally adjusting motor (35) to rotate the mobile plate (31), or/and at a vertical angle by means of actuating the vertically adjusting motor (43) to pivot the installing plate (50). Referring to FIGS. 9 and 10, in a second embodiment, the support has a fixed seat (60) instead of the bottom seat (10) and the elevating part (20) for securely installing the support on a wall.

The fixed seat (60) has a C-like section formed with an upper portion (601), a lower portion (602) parallel to the upper portion (601), and a fixed portion (603) between the upper portion (601) and the lower portion (602). The installing seat (60) is secured on the wall by fasteners.

The support has the rotating part (30), the longitudinally moving part (40), and the installing plate (50) mounted on the fixed seat (60). The horizontally adjusting motor (35) is mounted beneath the upper portion (601) as the immobile plate (32) in the previous embodiment. A rib (61) is formed between the upper portion (601) and the lower portion (602) to reinforce the strength of the fixed seat (60).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An automatically adjusting support for an LCD monitor comprising:

a bottom seat (10) having a bottom plate, a bracket (11) mounted on the bottom plate, and an upper plate (14) mounted on an upper surface of the bracket (11);

an elevating part (20) having a vertical threaded shaft (21) extending through the bracket (11), a first elevating gear (22) and a second elevating gear (23) engaged with each other and provided between the bracket (11) and the upper plate (14), an elevating motor (24) for driving the first elevating gear (22) mounted beneath the upper surface of the bracket (11) and connected to the first elevating gear (22), the vertical threaded shaft (21) threadingly engaged in the second elevating gear (23) and having an upper end (212);

a rotating part (30) having a linking member (36) mounted on the upper end (212) of the elevating threaded shaft (21), an immobile plate (32) secured on the linking member (36), a mobile plate (31) above the immobile plate (32), a first horizontally adjusting gear (33) and a second horizontally adjusting gear (34) engaged with each other and provided between the mobile plate (31) and the immobile plate (32), the second vertically adjusting gear (34) secured to the mobile plate (31), and a horizontally adjusting motor (35) for driving the first horizontally adjusting gear (33) mounted beneath the immobile plate (32) and connected to the first horizontally adjusting gear (33);

a longitudinally moving part (40) having a U-like seat (41) formed with two upright portions and a lateral portion between the upright portions and mounted on the mobile plate (31), two first ears (411) respectively formed on the upright portions of the U-like seat (41), a gear carrier (42) provided on the lateral portion of the U-like seat (41), a vertically adjusting motor (43) mounted beside the gear carrier (42), a worm (431) connecting to the vertically adjusting motor (43), a vertically adjusting gear (44) rotatably mounted in the gear carrier (42), and a horizontal threaded shaft (45) threadingly engaged in the vertically adjusting gear (44); and an installing plate (50) having two second ears (51) formed at a backward surface thereof and respectively pivotally mounted with the first ears (411), two third ears (53) formed below the second ears (51), two elongated holes (531) respectively defined through the third ears (53), and the horizontal threaded shaft (45) having a forward end (451) pivotally mounted between the third ears (53) by fasteners inserted through the elongated holes (531).

2. The automatically adjusting support as claimed in claim 1, wherein the bottom seat (10) has a first elevating limit switch (12) and a second elevating limit switch (13) mounted in the bracket (11), and the vertical threaded shaft (21) has a vertical stop disk (211) provided at a lower end thereof.

3. The automatically adjusting support as claimed in claim 1, wherein the rotating part (20) has a first horizontally adjusting limit switch (37) and a second horizontally adjusting limit switch (38) mounted on the mobile plate (31) and respectively at two sides of the second gear (34).

4. The automatically adjusting support as claimed in claim 1, wherein the longitudinally moving part (40) has a first vertically adjusting limit switch (46) and a second vertically adjusting limit switch (47) mounted behind the U-like seat (41), and the horizontal threaded shaft (45) has a horizontal stop disk (451) provided at a backward end thereof.

5. The automatically adjusting support as claimed in claim 1, wherein the vertical threaded shaft (21) having a channel (213) longitudinally defined at an outer periphery thereof, and the bottom seat (10) has a guide sheet (16) mounted on the upper plate (14) and having a lug located in the channel (213) of the vertical threaded shaft (21).

6. An automatically adjusting support for an LCD monitor comprising:

a fixed seat (60) having a C-like section formed with an upper portion (601), a lower portion (602) parallel to the upper portion (601), and a fixed portion (603) between the upper portion (601) and the lower portion (602);

a rotating part (30) mounted on the fixed seat (60), the rotating part (30) having a mobile plate (31) above the upper portion (601), a first horizontally adjusting gear (33) and a second horizontally adjusting gear (34) engaged with each other and provided between the mobile plate (31) and the upper portion (601), the second vertically adjusting gear (34) secured to the mobile plate (31), and a horizontally adjusting motor (35) for driving the first horizontally adjusting gear (33) mounted beneath the upper portion (601) and connected to the first horizontally adjusting gear (33);

a longitudinally moving part (40) having a U-like seat (41) formed with two upright portions and a lateral portion between the upright portions and mounted on the mobile plate (31), two first ears (411) respectively formed on the upright portions of the U-like seat (41), a gear carrier (42) provided on the lateral portion of the U-like seat (41), a vertically adjusting motor (43) mounted beside the gear carrier (42), a worm (431) connecting to the vertically adjusting motor (43), a vertically adjusting gear (44) rotatably mounted in the gear carrier (42), and a horizontal threaded shaft (45) threadingly engaged in the vertically adjusting gear (44); and an installing plate (50) having two second ears (51) formed at a backward surface thereof and respectively pivotally mounted with the first ears (411), two third ears (53) formed below the second ears (51), two elongated holes (531) respectively defined through the third ears (53), and the horizontal threaded shaft (45) having a forward end (451) pivotally mounted between the third ears (53) by fasteners inserted through the elongated holes (531).

7. The automatically adjusting support as claimed in claim 6, wherein the fixed seat (60) further has a rib (61) formed between the upper portion (601) and the lower portion (602) to reinforce the strength of the fixed seat (60).

8. The automatically adjusting support as claimed in claim 6, wherein the rotating part (20) has a first horizontally adjusting limit switch (37) and a second horizontally adjusting limit switch (38) mounted on the mobile plate (31) and respectively at two sides of the second gear (34).

9. The automatically adjusting support as claimed in claim 6, wherein the longitudinally moving part (40) has a first vertically adjusting limit switch (46) and a second vertically adjusting limit switch (47) mounted behind the U-like seat (41), and the horizontal threaded shaft (45) has a horizontal stop disk (451) provided at a backward end thereof.

* * * * *